US007076463B1

(12) United States Patent
Boies et al.

(10) Patent No.: US 7,076,463 B1
(45) Date of Patent: Jul. 11, 2006

(54) SYSTEM AND METHOD FOR PROVIDING DECENTRALIZED E-COMMERCE

(75) Inventors: Stephen J. Boies, Mahopac, NY (US); Samuel Dinkin, Austin, TX (US); Paul Andrew Moskowitz, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1151 days.

(21) Appl. No.: 09/628,233

(22) Filed: Jul. 28, 2000

(51) Int. Cl.
*G06Q 40/00* (2006.01)
(52) U.S. Cl. ....................................... 705/39
(58) Field of Classification Search ................ 205/1; 705/37, 26, 27; 707/3, 102
See application file for complete search history.

(56) References Cited

U.S. PATENT DOCUMENTS 5,978,768 A * 11/1999 McGovern ...................... 705/1
6,009,413 A    12/1999 Webber et al.
6,449,601 B1 *  9/2002 Friedland ..................... 705/37
6,510,434 B1 *  1/2003 Anderson .................... 707/100

OTHER PUBLICATIONS

"XML: It's Not Your Father's HTML" http://www.webreference.com/authoring/languages/xml/intro/ (downloaded on Jun. 6, 2000).

"NAA Classified Standards Task Force" http://www.naa.org/technology/clsstdtf/index.html (downloaded on Jun. 6, 2000).
"Real Estate DTD Design" http://www.4thworldtele.com/public/design/rsdesign.html (downloaded on Jun. 6, 2000).
"Why XML?—The Web Developer's Journal" wysiwyg://52/http://WebDevelopersJournal.com/articles/why_xml.html (downloaded Jun. 6, 2000).
"CNET-Hardware-Latest Prices-HP OmniBook 900 (Pentium III, 650MHz" http://computers.cnet.com/hardware/...g=st.co.1027.Ipbox.1027-311-1455723 (downloaded Apr. 11, 2000).
"CREST V2.0 NAA: Standard for Classified Advertising Data- Technical Overview" National Classified Advertising Standards Task Force (Jun. 19, 1999).

* cited by examiner

*Primary Examiner*—Hani M. Kazimi
*Assistant Examiner*—Thu Thao Havan
(74) *Attorney, Agent, or Firm*—Buckley, Maschoff & Talwalkar LLC; Stephen C. Kaufman

(57) ABSTRACT

A system and method of decentralized e-commerce for searching and indexing non-standardized content is provided. The content is tagged with provider tags to identify content fields of information within the content and is stored remotely at one or more network locations for searching and indexing by a portal server. The provider tags are devised according to each provider's own tagging scheme. The provider tags are in turn cross-referenced with portal tags of a portal tagging standard using key information supplied by the provider. The portal server uses the key information to conduct field specific searching and/or indexing of the decentralized, non-standardized content.

32 Claims, 11 Drawing Sheets

REGISTERED PROVIDER DATABASE 400

| Provider 410 | Affiliation 412 | Contact Information 414 | Content Category 416 | Type 418 | Network Address 420 | Key Information 422 | |
|---|---|---|---|---|---|---|---|
| | | | | | | Portal Tag 424 | Provider 426 |
| Henry White | Individual | 14 Clover Drive Greenport, NY 1854 (631) 534-6754 | Employment | Resume | www.aol.com/hwhite22 | Education | <education1> <education2> |
| | | | | | | Experience | <employment> |
| | | | | | | Licenses | <admissions> |
| Deborah Sullivan | Individual | 23 Spring Valley Road Lexington, MA 23454 (876) 549-0876 | Product Sale | Automobile | www.earthlink.com/dsullivan/auto | Make | <make> |
| | | | | | | Model | <model> |
| | | | | | | Price | <sales price> |
| | | | Product Auction | China | www.earthlink.com/dsullivan/china | Brand | <title> |
| | | | | | | Condition | <description> |
| | | | | | | Min. Bid | <price> |
| Atlas Realty | Company | 1432 Route 9A Sweetwater, FL 08765 (305) 928-8029 | Real Estate Sale | Residential | www.atlasrealty.com/22smithstreet | State | <address4> |
| | | | | | | Town | <address5> |
| | | | | | | Price | <sale price> |
| | | | | | | Bedroom | <bed> |

Fig. 4

CONTENT INDEX 500

| Category 510 | Type 511 | Network Address 512 | Portal Tags 520 ||||||
|---|---|---|---|---|---|---|---|
| | | | State 522 | Town 524 | Price 526 | Sq. Ft. 528 | Style 529 |
| Real Estate | Residential | www.aol.com/smith | New Jersey | Parsippany | 459,000 | 3200 | Hi-Ranch |
| | | www.earthlink.com/refner/house | New York | Riverhead | 250,000 | 2000 | Splanch |
| | | www.earthlink.com/jones/home | New York | Huntington | 349,000 | 2200 | Contemporary |
| | | www.atlasrealty.com/22smithstreet | New Jersey | Fanwood | 279,000 | 1500 | Ranch |

PORTAL TAGGING STANDARD DATABASE 600

| Category 610 | Type 612 | Portal Tags 614 | Required Tags 616 |
|---|---|---|---|
| Real Estate Sale | Residential | State, City, Town, Street Address, Style, Price, Sq. Ft., Taxes, School Dist., Rooms, Acreage, Bedrooms, Bathrooms, Assoc. Fees | State, City, Price, Style, Bedroom, Bathrooms |
| Real Estate Sale | Commercial | State, City, Town, Street Address, Price, Sq. Ft, Taxes, Services | State, City, Price, Sq. Ft. |
| Employment | Resume | Name, Address, Phone, Contact Information, Education, Experience, Affiliations, Licenses, Field, Interests, Computer Skills | Name, Education, Experience |

SYSTEM AND METHOD FOR PROVIDING DECENTRALIZED E-COMMERCE

FIELD OF THE INVENTION

The present invention relates generally to a system and method for decentralized e-commerce by providing for field specific searching and indexing of information within non-standardized, decentralized content.

BACKGROUND OF THE INVENTION

The internet has grown explosively over the past decade, during which time the internet has evolved into a multinational forum for e-commerce, educational and informational exchange. With this explosive growth, the sheer volume of content available on the internet has made it difficult for content providers to make their content known and for users to find the content. While large businesses with large marketing programs and budgets can garner great attention and generate high traffic volumes to their sites through mass media advertising and the like, small content providers, such as individuals and small businesses, go all but unnoticed.

Search engines, such as Yahoo and Excite, make finding information from even small business and individual web sites possible by spidering content and generating a searchable index of the content. However, these search engines are limited in that they generally index keywords from the full content and/or the metatag fields, such as, the "keyword" and "description" metatags that provide descriptive information regarding the content. However, there are no means for these search engines to parse the content and conduct field specific searches within the content. For example, a searcher looking to buy a used 1995 Porsche might conduct a search for the terms "Porsche", "For Sale" and "1995". Such a search may return thousands of hits, including articles or reviews about Porsches, sellers of Porsche related merchandise such as sunglasses, t-shirts, mugs, etc., new Porsches, Porsche parts, etc. Interspersed among all of these hits that are not relevant to the user's search request, there may be several sites selling Porsches. However, even among the sites selling Porsches, the search engine's summary of the search results is unlikely to provide critical information to the searcher, because the search engines have no way of finding and presenting the vital details in the index of hits. For example, it is unlikely that the index will include the price, model year, model type, mileage, etc. Since search engines typically extract the page title and several lines of text from the beginning of the content for inclusion in the search result index, these statistics will be presented to the user only by chance. Because this information is frequently not presented in the search result summary, the searcher must then link to each web page individually to locate the vital and full details. This method of searching is inefficient and frustrating for the user. As a consequence, the user may simply turn to a large used car web site having field searchable centralized content.

As an alternative forum for small businesses and individuals to engage in e-commerce on the internet, online classified ad sites such as Yahoo Classifieds and auction sites such as Ebay have been developed. These sites offer sellers an opportunity to add their content to a centralized searchable database typically organized by product category. Although these systems provide a forum for individuals and small businesses engage in e-commerce, the seller's content must be entered into each site database individually and is confined to the data fields of the site's database. Moreover, due to storage space limitations and the rapid consumption of storage space by thousands of users placing product listings, these systems typically permit only limited product information and descriptions. Thus, the addition of customized content design and presentation including multimedia, video and sound, as is common on most web sites, is generally not available on these systems.

More recently with the popularization of extensible markup language (XML), standard development groups have begun to create global content tagging standards for decentralized content sharing and searching. For example, $4^{th}$ World Telecom is proposing a tagging standard for real estate listings called the Real Estate DTD/Schema Design, and the Newspaper Association of America (NAA) is preparing a tagging standard for classified advertising called the NAA Standard for Classified Advertising Data. While these proposals provide a means for searching and/or indexing of decentralized content through standardized tagging schemes, the content must conform to the tags and tagging format of the particular tagging standard. This system is inflexible in that content developed pursuant to the tagging standard of one portal server can not be searched and indexed by another portal server using a different tagging standard. Thus the content provider is required to develop separate content for each portal tagging standard.

SUMMARY OF THE INVENTION

For the foregoing reasons, a need exists for a system and method for decentralized e-commerce, wherein decentralized, non-standardized content stored on a plurality of content servers can be searched and indexed by content fields of information within the content.

One object of the present invention is to provide a system and method of decentralized e-commerce that satisfies this need using a portal server to conduct field specific searches of non-standardized, decentralized content.

In accordance with one embodiment of the invention, there is provided a system and method for conducting field specific searches of decentralized, non-standardized content using key information. The system and method provide a portal server for receiving content search requests from users. The search requests contain search terms associated with portal tags. The associated portal tags define search criteria wherein the search for a term will be restricted to content fields corresponding to that term's associated portal tag. The content is stored on a plurality of remote content servers and is tagged by the provider using a tagging language such as XML to identify important content fields of information within the content. Each content provider may tag its content according to its own tagging scheme. The content providers in turn supply key information cross-referencing their tags to corresponding portal tags during a registration process. In this way, the portal server searches the content of each provider by comparing each search term associated with a portal tag to content identified by a corresponding provider tag.

In accordance with yet another embodiment of the invention, the portal server generates a content index of all registered content prior to receiving a search request. The content index contains a record for each provider's content. Each record has data fields identified by portal tags. The data fields for each record are filled with the assistance of the key information. The key information is used to identify and extract content identified with provider tags corresponding to each portal tag. The extracted content is then stored in the corresponding portal tag field of the content index. In this way a field searchable index of the content is generated. In this embodiment, user search requests are conducted on the content index, instead of directly on the content.

In accordance with another aspect of this embodiment of the invention, the portal server may process a user search request by first searching the content index for the search terms associated with portal tags that are indexed, and second searching the content directly for search terms associated with portal tags that are not indexed. In this way, the content index may be used to exclude content that does not meet at least a portion of the search request, so that the decentralized content search is reduced to a smaller subset of content.

In accordance with other aspects of the invention, the portal server compiles and transmits a summary of the search results to the user, and engages in the selection and transaction of content items and services for sale, auction or the like.

These and other features, aspects and advantages of the present invention will become better understood with regard to the following description, appended claims and accompanying drawings.

BRIEF DESCRIPTION OF THE DRAWINGS

The accompanying drawings illustrate certain embodiments of the invention where:

FIG. 4 illustrates an exemplary registered provider database shown in FIG. 2.

FIG. 5 illustrates an exemplary content index shown in FIG. 2.

FIG. 6 illustrates an exemplary portal tagging standard database shown in FIG. 2.

DETAILED DESCRIPTION

The present invention is described in terms of the above exemplary embodiments. This is for convenience only and is not intended to limit the application of the present invention. In fact, after reading the following description, it will be understood how to implement the present invention in alternative embodiments.

I. Introduction

Briefly, the method and system according to one embodiment of the invention satisfies the shortcomings of the existing methods and systems for searching non-standardized, decentralized content. One embodiment of the present invention provides for a portal server to conduct field specific searches of non-standardized, decentralized content supplied by one or more content providers and stored remotely on one or more content servers. Field specific searching is made possible by using key information. The key information relates provider tags identifying fields of information in content with corresponding portal tags from a portal tagging standard. In this way, each content provider's unique provider tags are associated with a standard set of portal tags. Thus, using the key information, the portal server receives search requests containing search terms restricted by portal tags and compares the search terms to content identified by corresponding provider tags.

Using this system and method, content providers retain the flexibility to tag content in accordance with their own needs and do not have to restrict content to the requirements of any one portal server's tagging standard. Further, portal servers can create portal tagging standards according to their own needs and changing conditions while being able to retain access or gain access to a preexisting content base regardless of the content provider's tagging scheme.

Development of portal servers for decentralized e-commerce will be encouraged by the potential for revenue and profit generation. Revenue and profit generation may be by any or all of (1) the sale of advertising space on the user search interface, (2) exacting a percentage of sales of merchandise searched and sold through the portal, and/or (3) charging a fee for registration of content and/or for searching content.

Certain embodiments of the present invention will now be described with reference to the figures.

II. System Architecture

Figure 1:
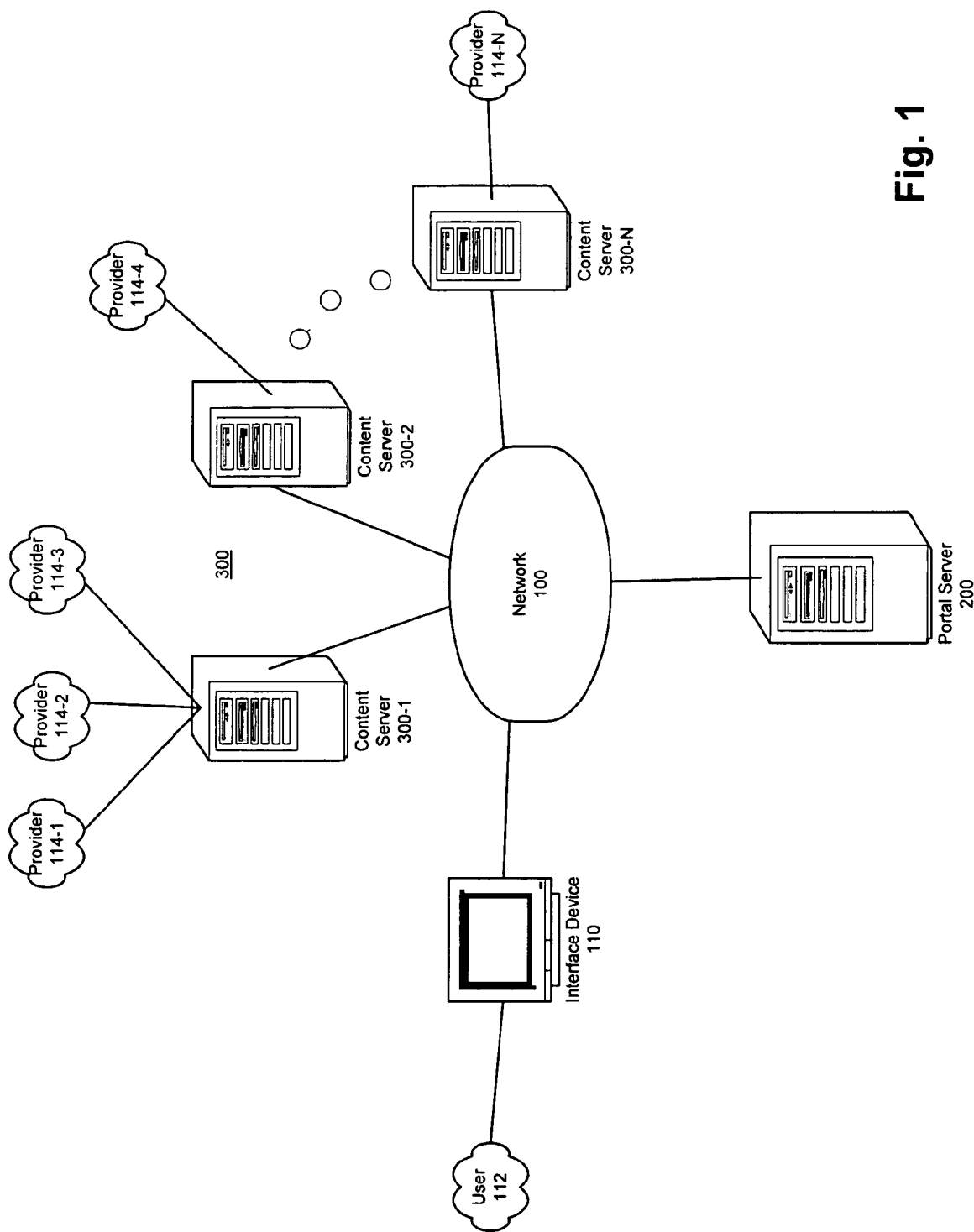
FIG. 1 illustrates a block diagram of the decentralized e-commerce system according to one embodiment of the invention.

The system architecture of one embodiment of the present invention is illustrated with reference to FIG. 1. As shown in FIG. 1, the system includes a portal server 200 configured to communicate with one or more content servers 300 storing content supplied by providers 114 and one or more users 112 through an interface device 110 (collectively the "nodes"). The portal server 200 acts as a search interface and intermediary between users 112 and content servers 300.

Each node is connected directly or indirectly to the portal server 200 via a network 100, such as, the internet, a local area network (LAN), a wide area network (WAN), an internet connection or the like, via a public switched phone network, dedicated data line, cellular network, personal communication system (PCS), microwave, satellite networks, cable or the like. The user interface device 110 and content servers 300 are capable of communicating with the portal server 200 directly or indirectly. Communication between the interface device 110, the portal server 200 and content server 300 is electronic by means of a network 100 and includes a conventional high-speed connection employing known communication protocols, such as TCP/IP, and is capable of decrypting and encrypting data received and transmitted between the nodes to secure transmissions using known protocols, such as secured socket layer (SSL) server certificate technology.

Portal Server and Content Servers

Figure 2:
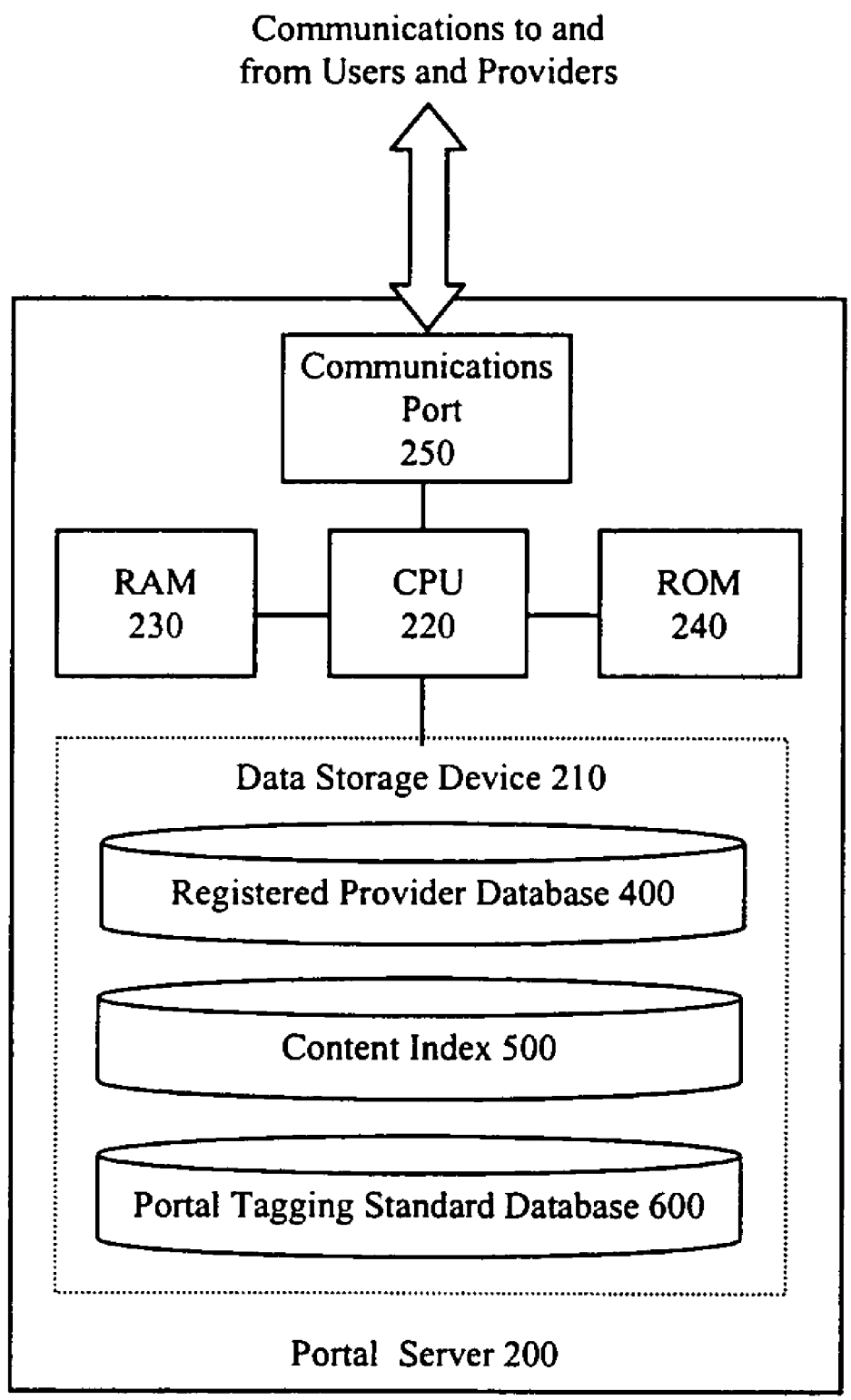
FIG. 2 illustrates one embodiment of the portal server used in the system shown in FIG. 1.
Figure 3:
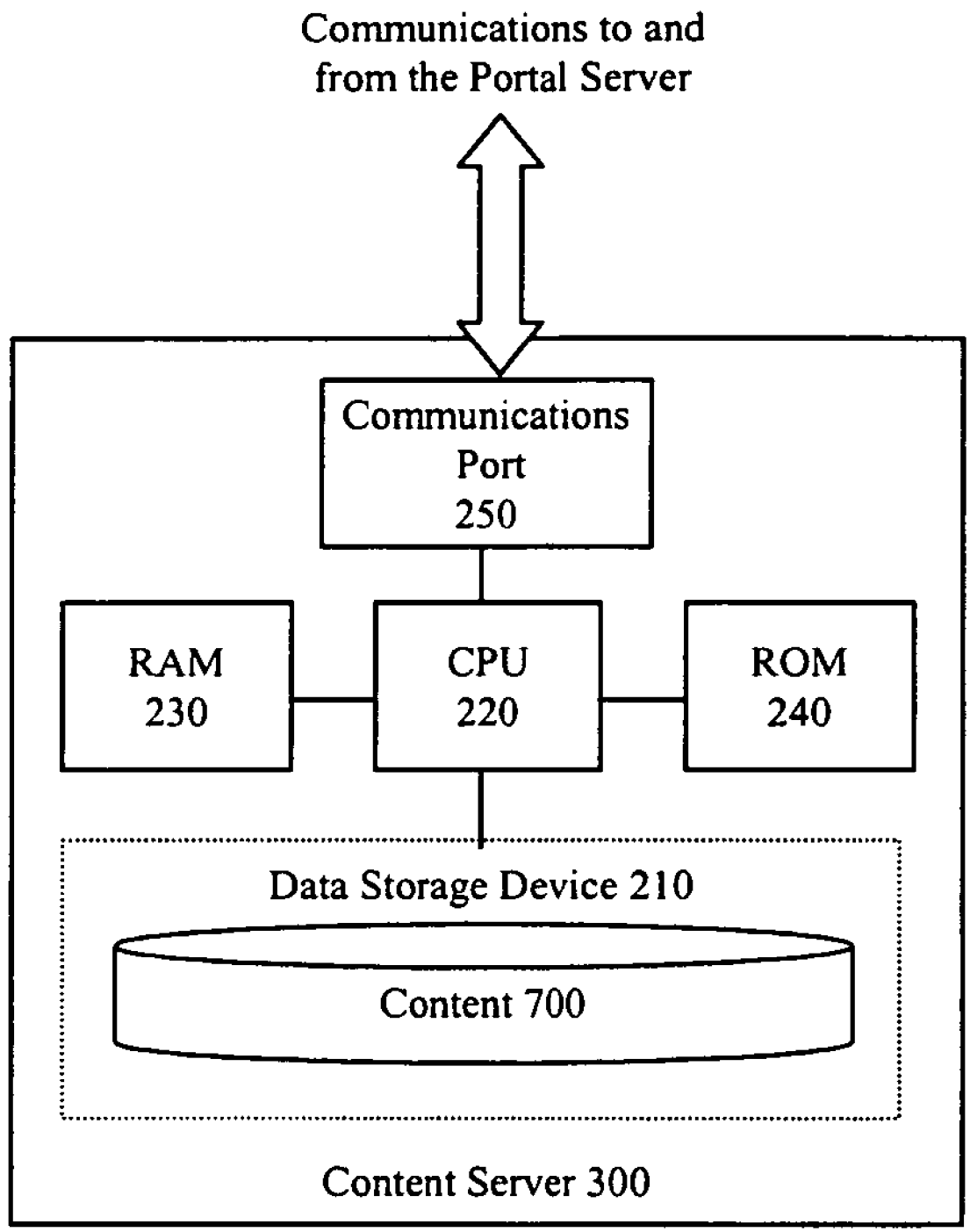
FIG. 3 illustrates one embodiment of the content server used in the system shown in FIG. 1.

Referring to FIGS. 2 and 3, the portal server 200 and each content server 300 are implemented as single general purpose computers as described below. In another embodiment the functionality of the portal server 200 and each content server 300 may be distributed over a plurality of computers. In that embodiment, the portal server 200 and/or each content server 300 are configured in a distributed architecture wherein the databases and central processing unit (CPU) 220 are housed in separate units or locations and are connected via a network connection as described above. It will be appreciated that an almost unlimited number of controllers may be supported. This arrangement yields a more dynamic and flexible system, less prone to catastrophic hardware failures effecting the entire system.

As shown in FIGS. 2 and 3, the portal server 200 and content servers 300 are each implemented as single general purpose computers including a CPU 220, random access memory (RAM) 230, read only memory (ROM) 240, a communications port 250 and a data storage device 210.

Referring to FIG. 2, the data storage device 210 of the portal server 200 stores the registered provider database 400, content index 500 and portal tagging standard database 600. Referring to FIG. 3, the data storage device 210 of each content server 300 stores content 700. As described more fully below, the registered provider database 400, content index 500, and portal tagging standard database 600 are used by the portal server to register providers and conduct searches of content 700 having tagged content fields.

The CPU 220 comprising a conventional microprocessor such as an Intel Pentium processor electrically coupled to each of the portal server and content server's other elements. The CPU 220 executes program code stored in one or more of ROM 240, RAM 230 and data storage device 210 to carry out the functions and acts described in connection with the portal server 200 and each content server 300. The CPU 220 comprises at least one high-speed digital data processor adequate to execute program modules for the provider registration process, database creation process and user search process described in detail below in connection with FIGS. 8 through 10. The CPU 220 interacts with ROM 240, RAM 230 and data storage device 210 to execute stored program code according to conventional data processing techniques.

Interface Device

According to one embodiment of the invention as shown in FIG. 1, a user interacts and communicates with the portal server 200 over network 100 using an interface device 110 to search and view content 700 stored on content servers 300. The interface device 110 is a web browser based system implemented as a single interactive visual display device such as a general purpose computer, a personal digital assistant (PDA), or the like. There are many commercial web browser software programs that can enable the communications required between the interface devices 110, portal server 200 and content servers 300, the primary function being transmission and reception of content through the network 100 and presentation of content to the user 112. Examples of such software programs include the Netscape Navigator browser by Netscape Corporation and the Internet Explorer browser by Microsoft Corporation.

II. Data Storage and Formats

In the illustrated embodiment of the invention, data is stored on the portal server 200 and the content servers 300. The portal server 200 stores the registered provider database 400, content index 500 and portal tagging standard database 600. The content servers 300 store content 700.

Figure 7:
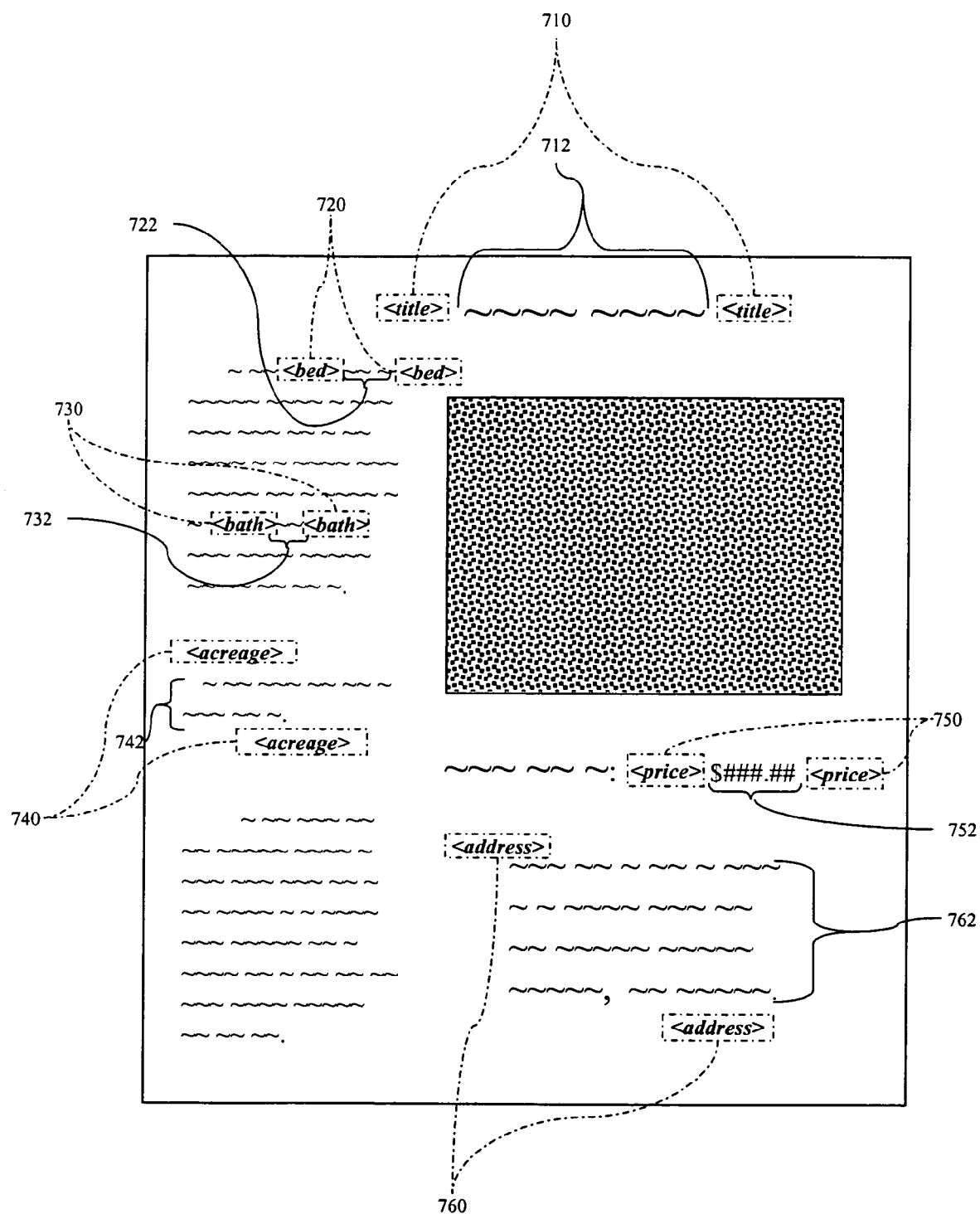
FIG. 7 illustrates sample content stored on a content server shown in FIG. 3.

Samples of database records from the registered provider database 400, content index 500 and provider tagging standard database 600 are shown in FIGS. 4–6, respectively. Exemplary content 700 is illustrated in FIG. 7. The organization of these databases and content, including, specific data and fields illustrated in these figures represents only one embodiment of the records stored in the databases. Moreover, it should be understood that the databases themselves are only representative, that the information contained therein could equally be consolidated into fewer databases or divided up among more databases.

Registered Provider Database

The registered provider database 400 shown in FIG. 4 is used to store information relating to the content provider and its content. Referring to the sample records 430–434 illustrated in FIG. 4 of the registered provider database 400, each record contains data fields 410–426. These fields correspond to provider 410, affiliation 412, contact information 414, content category 416, type 418, network address 420 and key information 422. The key information field has sub-fields for portal tag 424 and provider tag 426.

The data fields for each record are populated with information supplied by each content provider during the provider registration process. The initial three fields are primarily self explanatory and administrative in nature. The provider field 410 identifies the name of the provider, the affiliation field 412 indicates whether the provider is an individual or a company and the contact information field 414 contains the address and phone number for each provider.

The remaining four fields and two sub-fields are instrumental in the handling and searching of the provider content. The content category field 416 and type field 418 categorize each provider's content within one of the categories and types of information for which a portal tagging standard has been created. As will be discussed in further detail below, there is a unique portal tagging standard for each category and type of content. The network address field 420 provides the network location of the stored content on a content server 300. The address stored in this field is used by the portal server 200 to locate each provider's content on a remote content server. The key information field 422, and its portal tag 424 and provider tag 426 sub-fields relate provider tags to corresponding portal tags of the portal tagging standard. For example, referring to exemplary record 430, one of the portal tags for the employment resume category and type is the "Experience" tag. The content provider has indicated that the "<employment>" provider tag identifies the content field in the provider's content containing information corresponding to the "Experience" portal tag. This relationship is supplied by each provider and recorded in portal tag field 424 and provider tag field 426. As will become more apparent below, the key information is instrumental in facilitating the search and indexing of each provider's content.

Content Index

In the illustrated embodiment of the invention a content index may be generated and stored on the portal server for each of the one or more of the categories and types of content. The content index 500 contains excerpts from one or more content fields of each provider's content. The excerpts are stored and organized by corresponding portal tags, whereby field specific searches can be conducted on the content index rather than directly on the decentralized content. All categories and types of content may be indexed within one content index, or a separate content index may be generated for each category and type of content.

Referring to FIG. 5, exemplary records of a content index for the category and type residential real estate are illustrated. The exemplary content index 500 contains records 530–536 having data fields 510–529. The data fields 510–529 correspond to category 510, type 511, network address 512 and portal tags 520 having portal tag sub-fields 522–529.

The category field 510 and type field 511 identify the portal tagging standard category and type to which the content relates. The network address field 512 stores the physical network address of the content on a content server 300. The exemplary portal tags field 520 has sub-fields for state 522, town 524, price 526, square feet 528 and style 529. It should be understood that these sub-fields are only representative and may be selected from among all of the portal tags in the portal tagging standard for the chosen category and type of content. Therefore, the content index for this or another category and type of content may have different sub-fields, and/or fewer or more sub-fields than the exemplary content index 500 shown in FIG. 5.

For example, as shown in FIG. 5 several exemplary records from the type and category of residential real estate content are shown. The portal tagging standard for residential real estate may include portal tags relating to the state and town that the property is located in, the taxes, the price of the home, the square footage, the style of the home, the acreage, the number of bedrooms, the number of bathrooms and the like. However, so as not to duplicate and centralize the content, the content index is limited to content fields relating to only a subset of all the portal tags in a portal tagging standard. As shown only the state 522, town 524, price 526, square footage 528 and style 529 have been indexed. Alternatively, a content index for the employment resume category and type may contain entirely different sub-fields such as, education, experience and like fields selected from the employment resume category and type portal tagging standard.

The data fields 510–529 of the exemplary content index 500 are populated with a combination of information extracted from the registered provider database and from each provider's content during indexing. The category, type and network address fields are extracted from fields 416, 418 and 420 respectively of the registered provider database 400. The portal tag sub-fields 522–529 are populated with content extracted from content fields identified with provider tags corresponding to the portal tag fields.

Portal Tagging Standard Database

The portal tagging standard database defines a set of portal tags and required tags for each category and type of content that can be registered by a provider. Thus, each record in the database corresponds to a unique portal tagging standard applicable to a particular category and type of content.

Exemplary records 630–634 of the portal tagging standard database 600 are illustrated in FIG. 6. The portal tagging standard database 600 contains data fields 610–616 corresponding to category 610, type 612, portal tags 614 and required tags 616. The data fields for each of these records are populated by the portal server or a third party developer of the portal tagging standard database 600. The category field 610 and type field 612 contain the descriptive name of the category and type of content to which the portal tagging standard applies.

Each portal tagging standard comprises a set of portal tags stored in portal tags field 614 and required tags stored in required tags field 616. The collection of portal tags in a portal tagging standard provides a standard set of tags used by the portal server to interface with a user, and search or index content. The required tags field 616 stores a list of portal tags for which a content provider must provide key information relating a provider tag to each portal tag. The required tags set a basic minimum level of content and searchability for a provider to register its content. For example, in a portal tagging standard for residential real estate a provider may be required to supply provider tags identifying content fields containing at least a town and price, since almost every user conducting a search will want to be able to restrict the search to a particular town and price range.

Other contemplated portal tagging standards include standards for handling employment resumes, and the sale and auctioning of merchandise and services. A portal tagging standard for employment resumes may include portal tags for content relating to at least candidate's name, address, education, experience, and a job classification, such as accounting, engineering, or attorney. A portal tagging standard for the sale of merchandise or services may include portal tags identifying at least the name of the merchandise, a description and a price. A portal tagging standard for the auction of merchandise would be similar to the standard for sale but might have a minimum bid tag rather than a price tag. It should be understood that these are only representative examples of portal tags for some content categories and types and that the method and system of the invention can be used in conjunction with all categories and types of content.

Content Sample

Referring to FIG. 7, a sample of tagged content for the sale of real estate is illustrated. The sample content has provider tags for "<title>" 710, "<bed>" 720, "<bath>" 730, "<acreage>" 740, "<price>" 750 and "<address>" 760 marking content 712, 722, 732, 742 and 752 respectively. Content supplied by a provider may be any readable data file, such as a word processor file, an HTML or XML file, or the like. The content may relate to any categories and types of content for which a portal tagging standard has been created. The content is tagged to identify content fields within the content. The content may be tagged using any markers distinguishable from the content itself, such as the tagging scheme of known languages such as XML. A pair of provider tags is used to mark the beginning and end of each discreet content field of information within the content.

As discussed above, the provider tags do not have to correspond in name to the portal tags of the portal tagging standard for the category and type of content. Moreover, each provider may have its own unique provider tags. Instead of requiring identically named portal and provider tags, key information is used to cross-reference each provider tag to a corresponding portal tag. The key information is supplied by each provider during the provider's content registration process. In this way each content provider can create and tag their content using their own tagging standard so that the same content can be used with multiple portal servers simply by adjusting the key information to comply with each portal server's tagging standard.

Figure 8:
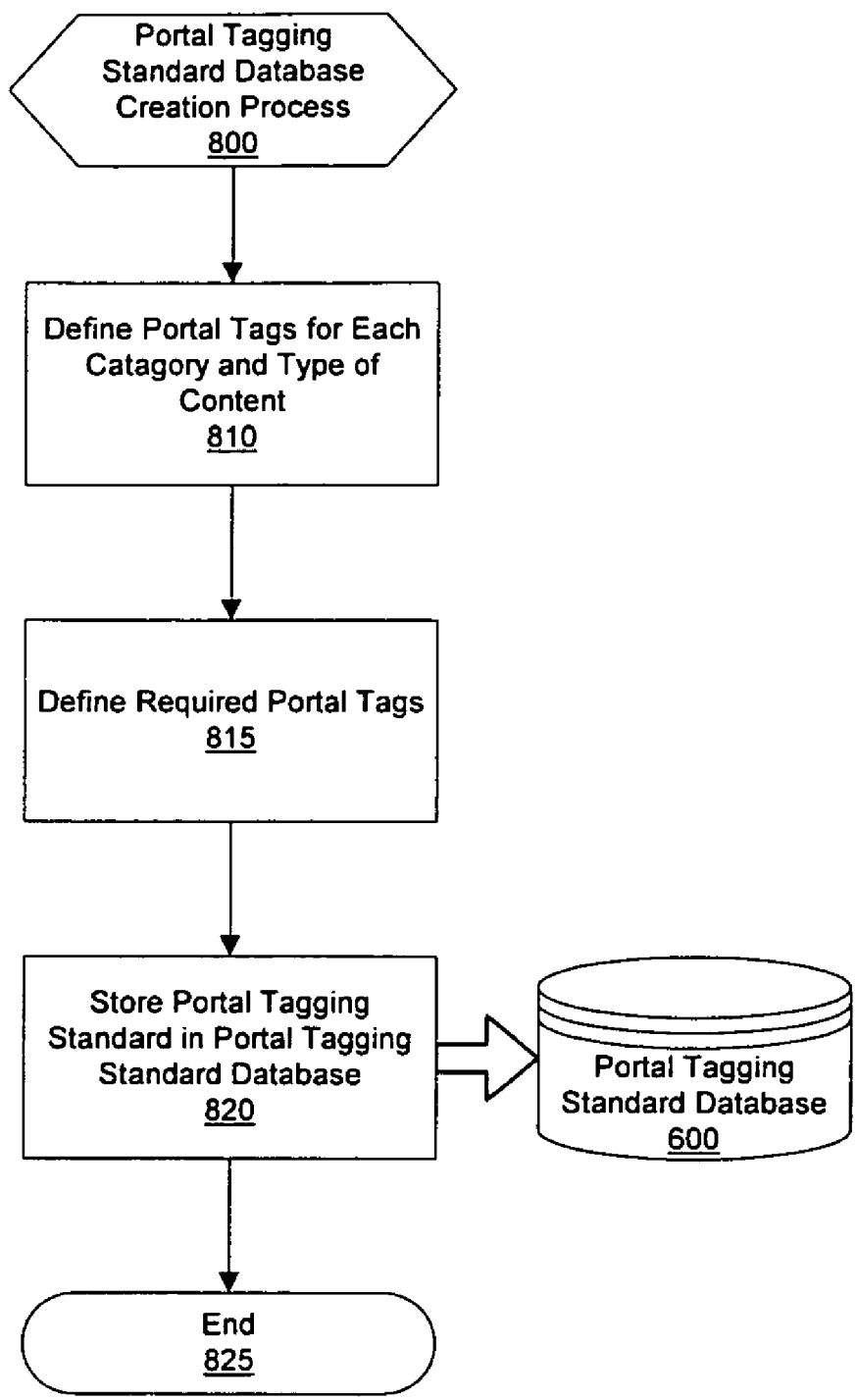
FIG. 8 illustrates the process of creating portal tagging standards as executed by the system shown in FIG. 1.
Figure 9:
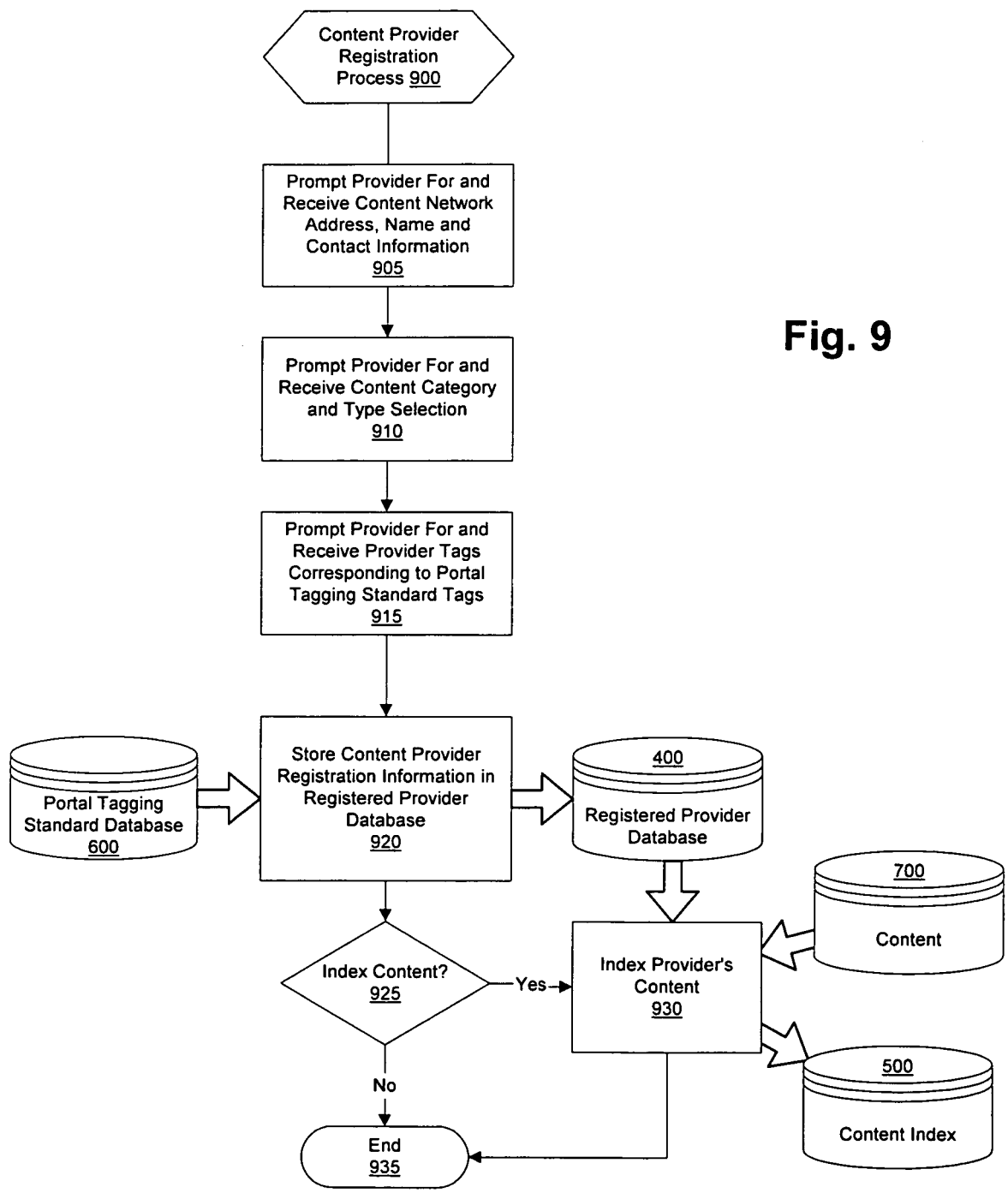
FIG. 9 illustrates the process of registering providers as executed by the system shown in FIG. 1.

The processes of creating the registered provider database 400, content index 500, portal tagging standard database 600 and content 700, as well as the other operations of the system and method described with reference to FIGS. 1–7, are illustrated in FIGS. 8–10, described in detail below.

III. Portal Tagging Standard Database Creation Process

The portal tagging standard database creation process is the preliminary step in setting up the portal server 200 for registering content providers and searching content. The portal tagging standard database creation process comprises generating and storing a portal tagging standard for each category and type of content to be registered and searched.

The portal tagging standard database creation process is illustrated in FIG. 8. In step 810 portal tags for each category and type of content portal tagging standard are defined. A portal tag is usually created for each discrete vital piece of information or data within a category and type of content that a user is likely to want to identify and search. For example, as shown in FIG. 6, in content relating to the sale of residential real estate, portal tags for state, city, street, taxes, bedrooms, bathrooms and the like have been created since a user searching for houses is likely to want to restrict a search to one or more of these fields of data.

Once the portal tags are defined, in step 815 required tags are selected from among the defined portal tags. Referring back to FIG. 6, the required tags field 616 contains a list of selected portal tags from the portal tags field 614. The required tags are those portal tags for which a provider must have a correspondingly tagged content field. The failure of a provider to provide and tag content corresponding to required portal tags may prevent the provider from registering the content. The benefit of the required tags is that only content that meets a certain minimum level of content tagging for field specific searching can be registered, thus encouraging thorough tagging and providing accurate field specific searching.

Once the portal tags and required tags are created for a category and type of content, in step 820 the portal tags and required tags are stored in the portal tagging standard database 600. Thereafter, the portal server may begin registering content related to each category and type for which a portal tagging standard has been created.

IV. Content Provider Registration Process

Referring to FIG. 9, the content provider registration process 900 is illustrated. The content provider registration process registers content by collecting and storing each provider's contact information, including the content network address and key information relating each provider's tags to corresponding portal tags. The registration process begins with step 905. In step 905, the portal server collects information from each provider including the content network address, provider name and contact information. Proceeding to step 910, the content provider selects the category and type of portal tagging standard most closely related to the provider's content. The provider may select the category and type from among the available portal tagging standards stored in the portal tagging standard database 600.

In step 915, the provider supplies key information cross-referencing provider tags with corresponding required and nonrequired portal tags. For example, referring to FIGS. 6 and 7, if the content is for the sale of residential real estate the content provider will be prompted to associate provider tags, such as "<address>", "<bed>", "<price>", etc. shown in FIG. 7, with each of the portal tags in portal tag field 614, such as "state", "city", "price", "bedrooms", etc. In the illustrated embodiment, the provider must at least provide key information associating provider tags to the required portal tags, but may also provide key information for the nonrequired portal tags. Record 434 in FIG. 4 illustrates key information cross-referencing the portal tags "state", "town", "price" and "bedroom" to corresponding provider tags "<address4>", "<address5>", "<sale price>" and "<bed>". This key information indicates that state information in this content will be identified by the "<address4>" tag, town information will be identified by the "<address5>" tag, and so on. Proceeding to step 920, the content provider registration information is stored in the provider database 400 shown in FIG. 4.

In step 925 the system is prompted as to whether the newly registered content should be indexed. In one embodiment of the invention all of the registered content is indexed in a content index 500 stored on the portal server 200. The content index 500 permits the portal server to conduct searches either wholly or partially in the content index 500, as will be discussed in detail below. Alternatively, in other embodiments of the invention the content is not indexed, and each user search is conducted directly on the content 700 stored on each content server 300. If the content is not to be indexed the registration process is complete and ends at step 935. If the content is to be indexed the process proceeds to step 930.

Indexing and searching the index provides a speed and an efficiency advantage over searching the content directly. However, since not all of the content is indexed, some search capabilities are lost by searching the index alone. Indexing requires a balancing act of providing adequate representation of the content without duplicating too much of the content itself in the index. Therefore, the index contains only the most important portal tags for a category and type, and may only contain excerpts of the correspondingly tagged provider content. For example, the content index 500 for residential real estate illustrated in FIG. 5 includes only the "state", "town", "price", "sq. ft." and "style tags". Thus, if a user wants to conduct a search using the "bedrooms" portal tag as a search criteria the portal server could not search the index, since the bedroom field has not been indexed. As will be discussed in further detail below, a resolution to this problem is that, the portal server may first search the index for those search criteria in the index, and then search a potentially reduced amount of content directly for the non-indexed search criteria.

In step 930 the system indexes the content and creates a record in the content index 500 shown in FIG. 5. As discussed above, the content index 500 contains fields for category 510, type 511, network address 512 and portal tags 520 having exemplary subfields state 522, town 524, price 526, sq. ft. 528 and style 529. The subfields 522–529 are a subset of portal tags from the entire portal tagging standard for each category and type of content. This subset of portal tags is common only among all indexed content for an individual category and type, such that the indexed information is consistent for all indexed content in a category and type.

The portal tag subfields 522 through 529 for each record are populated by the portal server. The portal server populates these fields by using the registered provider database 400 to associate the portal tags 522 through 529 with the corresponding provider tags. Once the portal server has associated each portal tag 522 through 529 with its corresponding provider tag 426, the portal server searches the content 700 for content fields tagged with corresponding provider tags. For each matching content field, at least a portion of content is extracted from the content field and stored in the appropriate field for the record in the content index 500. This process is repeated for each of the exemplary portal tag subfields 522 through 529. The process concludes at step 935.

The indexing process may occur only once at the time of the content provider registration or additionally the content may be reindexed on a periodic basis such as daily, monthly or annually so that the index accurately reflects revisions and changes to the physical content located on the remote content servers 300.

V. User Search Process

Figure 10A:
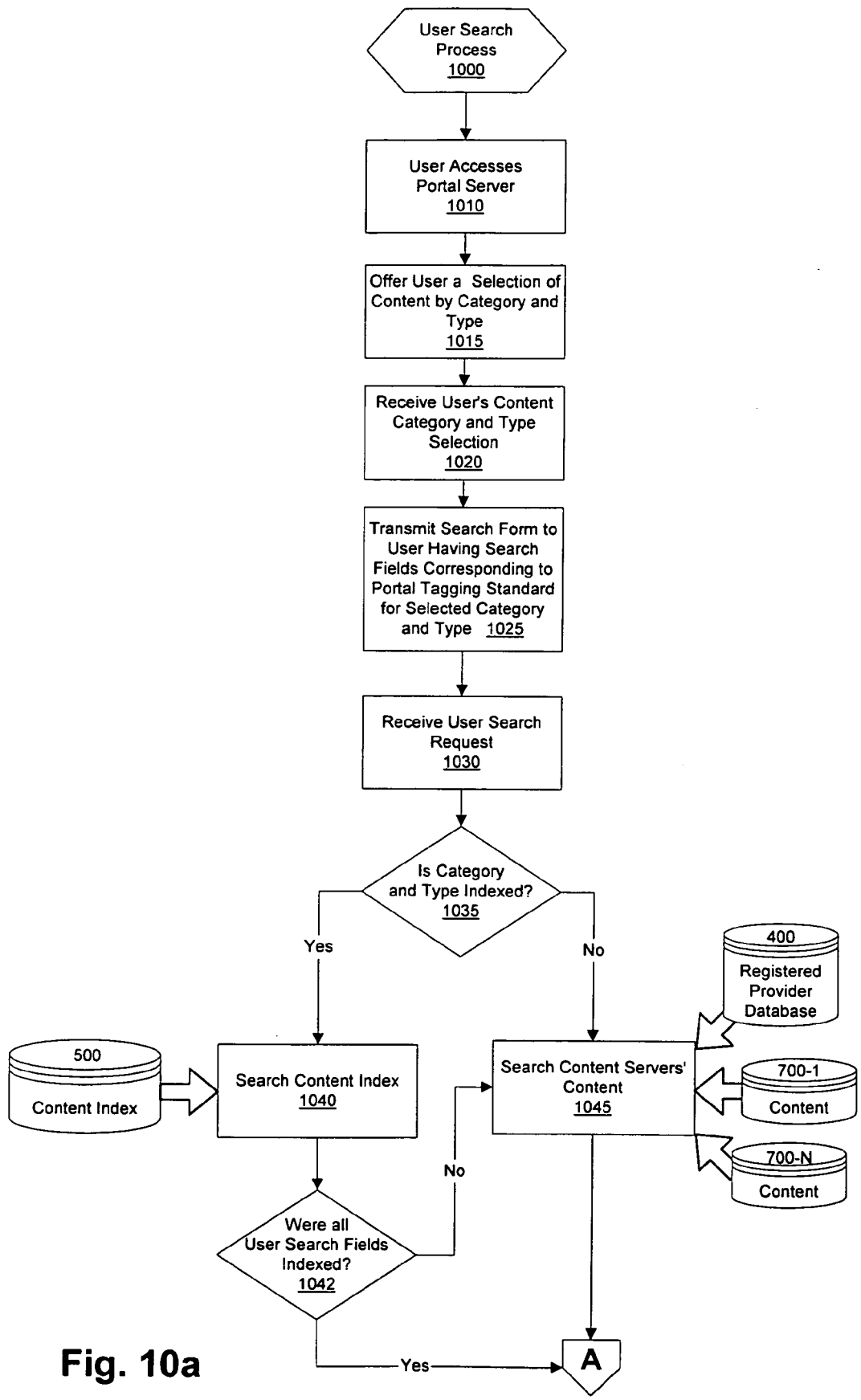
FIGS. 10a–b illustrates the content search process in response to a user request as executed by the system shown in FIG. 1.

Referring to FIG. 10a, the user search process 1000 is illustrated. The user search process begins at step 1010. In step 1010, the user accesses the portal server website. In step 1015, the portal server offers the user a selection of content by category and type. The category and type of content is selected from among the categories and types of content that have been registered by content providers. In step 1020, the portal server receives the user's content category and type selection. The portal server transmits a search request form to the user in step 1025. The search request form contains search fields for each of the portal tags in the portal tagging standard related to the selected category and type. Alternatively, where the portal server has created an index of content for the selected category and type, the user may either be offered the opportunity to search on all fields or only those fields which have been indexed in the content index 500. If the content is not indexed the user may be offered the opportunity to search on any of the fields within the portal tagging standard or only the fields for the required tags. Additionally, the user may be offered the opportunity to search primarily within the fields relating to the required portal tags and secondarily search the fields associated with the nonrequired portal tags.

After completion of the search request form, in step 1030, the portal server receives the user's search request. In step 1035, the portal server determines whether the category and type of content to be searched has been indexed. If the category and type has been indexed, the process proceeds to step 1040, and if it has not been indexed then to step 1045.

Referring first to the indexed category and type of content, in step 1040, the portal server searches the content index 500 for content matching the user's search request. As discussed in conjunction with step 1025, the user's search request includes search terms associated with each search field related to a portal tag. Accordingly, the search is conducted on a field specific basis, wherein the search terms associated with search fields are compared with the content stored in the corresponding portal tag field in the content index 500. Each of the search terms and associated search fields in the search request is compared with each of the records in the content index. As the portal server identifies matches, it generates a list of the content index records that match the user search request.

Where a user has been permitted to search on portal tag fields that have not been indexed, the process proceeds to step 1042. In step 1042, if the user's search request includes search fields that have not been indexed, the portal server proceeds to search the content directly. When searching the content directly after conducting an index search, the portal server may be able to reduce the number of content sites it has to search by excluding content that did not match the search terms during the index search.

For example, referring to the sample content index shown in FIG. 5, assume a user submitted a search for "New York" or "Connecticut" in the state field 522, and "5" or "five" in the bedrooms field (not indexed). In response to this search request, since the bedrooms field has not been indexed, the portal server searches the content index 500 only for entries matching the search terms in the state field 522. In the illustrated records, records 530 and 536 are excluded because the state is "New Jersey". Records 532 and 534 are matches since the state for each is "New York". Since the bedroom field is not indexed, the portal server will search the decentralized content directly for the search terms associated with the bedroom field. Because the search request required a match in both the state field 522 "and" the bedrooms field, the search of decentralized content can exclude all content associated with entries not matching the state field 522 search terms; i.e. the portal server does not have to search content corresponding to index entries 530 and 536 since they have already been excluded as matches. The use of indexing and the combination of indexing and direct content search provides for increased speed and efficiency by eliminating or reducing the amount of full content based searching over the network.

Referring back to step 1035, if the category and type of content are not indexed, the process proceeds to step 1045. In step 1045 the portal server directly searches the content for content matching the user's search request. The portal server first searches the registered provider database to identify all registered content in the selected category and type of content and the corresponding network addresses. The portal server in turn searches the content stored at each of the network addresses. For each piece of content, the portal server uses the key information in the registered provider database to cross-reference each portal tag associated with a search term to the corresponding provider tag. The portal server then searches the content to identify matching content fields. A matching content field is a content field identified by the provider tag corresponding to the portal tag associated with the search term. The portal server then compares the search term with the matching content field. This process repeats for each of the search terms and associated portal tags for all content in the selected category and type.

Figure 10B:
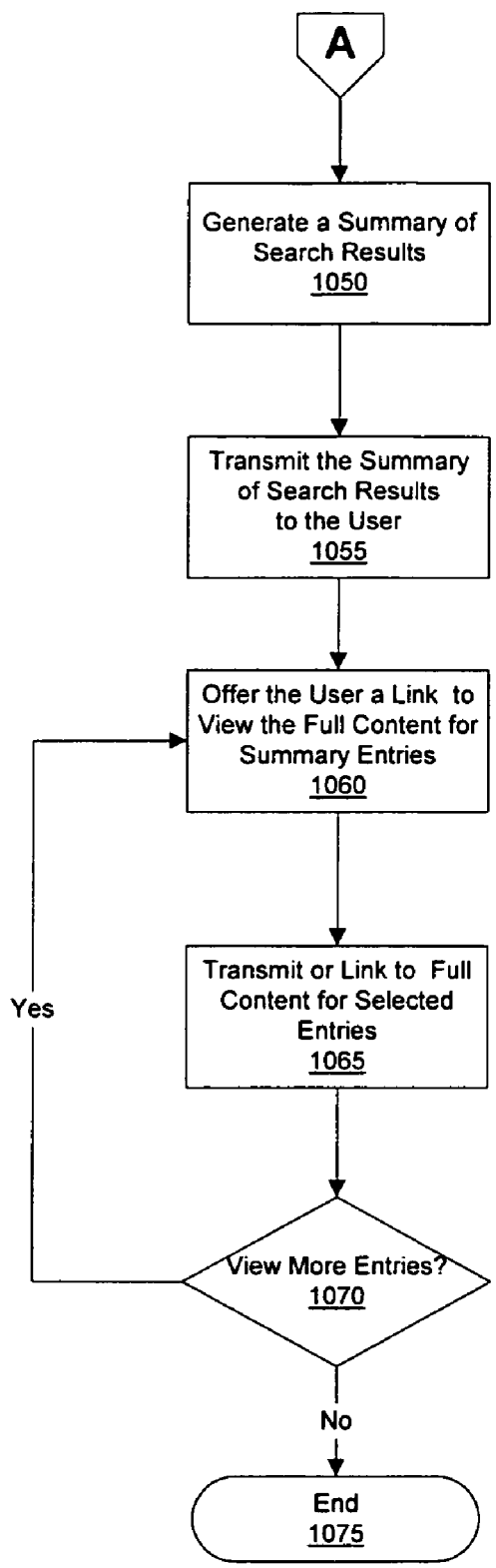

Referring to FIG. 10*b*, the index and content search processes rejoin in step 1050. In step 1050 the process generates a summary of the content matching the user's search request. The summary of search results may be presented in a tabular form and includes links to the full content along with fields containing important information from the content. The information displayed should be selected based on the usefulness in helping the user review the result. Thus, displaying content corresponding to the required portal tags is a good starting point. In addition, displaying content corresponding to the searched portal fields may also be beneficial for the user. By providing a search summary, the user may quickly scan the vital information from each matching content site. In step 1055 the summary is transmitted to the user for viewing.

In the illustrated embodiment, in step 1060 the user is offered the opportunity to link to the full content of any of the entries listed in the summary. The portal server thereafter receives a user selection and transmits or links the user to the full content for the selected content. In step 1070 the portal server determines if the viewer wants to view more entries for the summary. If so, the process returns to step 1060. If not, the process ends at step 1075.

Alternatively, in step 1060 the user may be offered the opportunity to purchase or enter an auction for merchandise offered in content matching the user's search request. In this embodiment, the portal server may handle the auction and/or transaction directly for the provider or direct the user to the provider's e-commerce or auction site.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

What is claimed is:

1. A method of decentralized e-commerce, comprising:
   receiving a search request from a user to search content stored on at least one content server, wherein the content includes provider tags identifying each of at least one content field within the content, and wherein the search request includes at least one search term associated with at least one portal tag, the portal tag being part of a portal tagging standard and identifying a type of data within content to be searched;
identifying the provider tag corresponding to the portal tag using a cross-reference of portal tags corresponding to provider tags; and
comparing the search term with a content field tagged with a provider tag corresponding to the portal tag associated with the search term.

2. The method of claim 1, further comprising generating a summary of content matching the search request.

3. The method of claim 2, further comprising transmitting the summary to the user.

4. The method of claim 3, wherein the summary includes a link to the matching content.

5. The method of claim 1, wherein the content is for the sale of merchandise.

6. The method of claim 5, wherein the portal tagging standard requires tags for identifying merchandise name, description and price.

7. The method of claim 6, further comprising:
offering the user the option to purchase the merchandise;
receiving a request to purchase the merchandise from a user; and
transmitting the request to purchase to the provider of the content.

8. The method of claim 1, wherein the content provider's content is for merchandise to auction.

9. The method of claim 8, wherein the portal tagging standard requires tags for identifying merchandise name, description and minimum bid.

10. The method of claim 9, further comprising managing an auction, wherein managing the auction comprises:
receiving bids from users;
identifying a winning bidder; and
notifying the provider of the content of the identified winning bidder.

11. The method of claim 1, wherein the provider's content is a resume.

12. The method of claim 11, wherein the portal tagging standard requires tags for identifying name, address, education, experience and job classification.

13. A method of decentralized e-commerce, comprising:
creating content wherein the content is tagged with at least one provider tag to identify each of at least one content field;
storing the content on a content server; and
registering the content with a portal server, comprising providing an address for the content and providing key information relating a provider tag to a corresponding portal tag in a portal tagging standard.

14. The method of claim 13, further comprising transmitting the content to the portal server.

15. A system of decentralized e-commerce, comprising:
means for receiving a search request from a user to search content stored on at least one content server, wherein the content includes provider tags identifying each of at least one content field within the content, and wherein the search request includes at least one search term associated with at least one portal tag, the portal tag being part of a portal tagging standard and identifying a type of data within content to be searched;
means for identifying the provider tag corresponding to the portal tag using a cross-reference of portal tags corresponding to provider tags; and
means for comparing the search term with a content field tagged with a provider tag corresponding to the portal tag associated with the search term.

16. The system of claim 15, further comprising means for generating a summary of content matching the search request.

17. The system of claim 16, further comprising means for transmitting the summary to the user.

18. The system of claim 17, wherein the summary includes a link to the matching content.

19. The system of claim 15, wherein the content is for the sale of merchandise.

20. The system of claim 19, wherein the portal tagging standard requires tags for identifying merchandise name, description and price.

21. The system of claim 20, further comprising:
means for offering the user the option to purchase the merchandise;
means for receiving a request to purchase the merchandise from a user; and
means for transmitting the request to purchase to the provider of the content.

22. The system of claim 15, wherein the content provider's content is for merchandise to auction.

23. The system of claim 22, wherein the portal tagging standard requires tags for identifying merchandise name, description and minimum bid.

24. The system of claim 23, further comprising means for managing an auction, wherein means for managing the auction comprises:
means for receiving bids from users;
means for identifying a winning bidder; and
means for notifying the provider of the content of the identified winning bidder.

25. The system of claim 15, wherein the provider's content is a resume.

26. The system of claim 25, wherein the portal tagging standard requires tags for identifying name, address, education, experience and job classification.

27. A system of decentralized e-commerce, comprising:
means for creating content wherein the content is tagged with at least one provider tag to identify each of at least one content field;
means for storing the content on a content server; and
means for registering the content with a portal server, comprising providing an address for the content and providing key information relating a provider tag to a corresponding portal tag in a portal tagging standard.

28. The method of claim 27, further comprising transmitting the content to the portal server.

29. An article of manufacture, comprising:
a computer usable medium having computer readable program code means embodied therein for decentralized e-commerce, comprising:
computer readable program code means for causing a computer to create content wherein the content is tagged with at least one provider tag to identify each of at least one content field;
computer readable program code means for causing a computer to store the content on a content server; and
computer readable program code means for causing a computer to register the content with a portal server, comprising providing an address for the content and providing key information relating a provider tag to a corresponding portal tag in a portal tagging standard.

30. A programmed computer for decentralized e-commerce, comprising:

a memory for storing computer executable code; and a processor for executing the program code stored in memory, wherein the program code includes:

code to receive a search request from a user to search content stored on at least one content server, wherein the content includes provider tags identifying each of at least one content field within the content, and wherein the search request includes at least one search term associated with at least one portal tag, the portal tag being part of a portal tagging standard and identifying a type of data within content to be searched;

code to identify the provider tag corresponding to the portal tag using a cross-reference of portal tags corresponding to provider tags; and code to compare the search term with a content field tagged with a provider tag corresponding to the portal tag associated with the search term.

31. A programmed computer for decentralized e-commerce, comprising:

a memory for storing computer executable code; and a processor for executing the program code stored in memory, wherein the program code includes:

code to create content wherein the content is tagged with at least one provider tag to identify each of at least one content field;

code to store the content on a content server; and code to register the content with a portal server, comprising providing an address for the content and providing key information relating a provider tag to a corresponding portal tag in a portal tagging standard.

32. A system for decentralized e-commerce, comprising:

a first database for storing at least one portal tagging standard having portal tags; and a second database for storing at least one registered content provider information, including key information and an address to content, wherein the address comprises a network location address to content having provider tags identifying each of at least one content field within the content, and the key information comprises a cross-reference of portal tags corresponding to provider tags; and a central processing unit configured to:

receive a user search request having at least one search term associated with at least one portal tag;

cross-reference each portal tag with at least one corresponding provider tag using the key information; and search the content by comparing each search term with each matching content field, a matching content field being a content field tagged with a provider tag corresponding to the portal tag associated with the search term.

* * * * *